United States Patent
Prat et al.

(10) Patent No.: US 10,249,265 B2
(45) Date of Patent: Apr. 2, 2019

(54) MULTI-DEVICE CONTENT PRESENTATION

(71) Applicant: Cisco Technology, Inc., San Jose, CA (US)

(72) Inventors: Yann Joel Prat, Elancourt (FR); Laurent Gardes, Meudon (FR); Olivier Lacour, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 15/369,928

(22) Filed: Dec. 6, 2016

(65) Prior Publication Data

US 2018/0158437 A1      Jun. 7, 2018

(51) Int. Cl.
*G06F 3/14* (2006.01)
*G09G 5/12* (2006.01)

(52) U.S. Cl.
CPC ............ *G09G 5/12* (2013.01); *G06F 3/1423* (2013.01); *G09G 2354/00* (2013.01); *G09G 2370/16* (2013.01)

(58) Field of Classification Search
CPC .. G09G 2354/00; G09G 5/12; G09G 2370/16; G06F 3/1423
See application file for complete search history.

(56) References Cited

U.S. PATENT DOCUMENTS

| | | | |
|---|---|---|---|
| 8,527,581 B2 | 9/2013 | Song et al. | |
| 8,582,956 B1 * | 11/2013 | Hegde | G11B 27/105 386/278 |
| 9,158,333 B1 | 10/2015 | Froment et al. | |
| 9,955,008 B2 * | 4/2018 | Chang | G06Q 10/10 |
| 2004/0221311 A1 * | 11/2004 | Dow | G06F 17/30784 725/52 |
| 2012/0311438 A1 | 12/2012 | Cranfill et al. | |
| 2013/0002532 A1 | 1/2013 | Raffle et al. | |
| 2013/0073675 A1 | 3/2013 | Hwang et al. | |

(Continued)

OTHER PUBLICATIONS

Bertolucci, Jeff; Sync YourSmart Phone and Tablet Computer With Your TV (Mar. 2013) Can be seen at: http://www.kiplinger.com/article/spending/T057-C000-S002-sync-smart-phone-tablet-computer-tv.html.

(Continued)

*Primary Examiner* — Muhammad N Edun
(74) *Attorney, Agent, or Firm* — Polsinelli PC

(57) ABSTRACT

In one embodiment, a method for presenting content on multiple devices is implemented on a computing device and includes: receiving selection of a multimedia content item, the multimedia content item including at least two media segments each of a different type, defining a first media segment of the at least two media segments as a primary media segment, defining at least a second media segment of the at least two media segments as at least one secondary media segment, allocating the at least one secondary media segment for presentation on at least one secondary presentation device, presenting the primary media segment on the computing device, detecting a current progress in the presenting, and based on said current progress, forwarding to the at least one secondary media segment an indication of an instruction for synchronizing presentation of the at least one secondary media segment with said presenting.

20 Claims, 3 Drawing Sheets

(56) References Cited

U.S. PATENT DOCUMENTS

| | | | |
|---|---|---|---|
| 2014/0068408 A1 | 3/2014 | Le Chevalier et al. | |
| 2014/0075465 A1* | 3/2014 | Petrovic | H04N 21/252 725/14 |
| 2014/0101535 A1 | 4/2014 | Kim et al. | |
| 2014/0184471 A1 | 7/2014 | Martynov et al. | |
| 2015/0033110 A1 | 1/2015 | Park | |
| 2015/0334472 A1* | 11/2015 | Kishore | H04N 21/23439 725/32 |

OTHER PUBLICATIONS

Davies, Chris; Plastic Logic Flexible Smartphone Epaper Companion Hands-On (Jun. 28, 2012) Can be seen at: http://www.slashgear.com/plastic-logic-flexible-smartphone-epaper-companion-hands-on-28235842/.

iTunes Preview; Papercut—Enhanced Reading Experience on the App Store (2015) Can be seen at: https://itunes.apple.com/us/app/papercut-enhanced-reading/id459776726?mt=8.

Jaye, Victoria; Making Great TV Even Better: The BBC's Approach to Companion Experiences (May 3, 2012) Can be seen at: http://www.bbc.co.uk/blogs/bbcinternet/2012/05/making_great_tv_even_better_th.html.

Mills; Papercuts: Lessons Learned From a Foray in Digital Publishing (Feb. 20, 2012) Can be seen at: https://ustwo.com/blog/papercuts-lessons-learned-from-a-foray-in-digital-publishing/.

Noordeloos, Chantai; Coyote: The Outlander (About Second Screen), Printed book: Tip My Hat publishing © 2014—ISBN: 978-94-91864-00-1 Can be seen at: http://www.coyotethebooks.com/about-second-screen/.

Noordeloos, Chantal; Coyote: The Outlander (Amazon-2016); Can be seen at: http://www.amazon.com.co/uk/Coyote-Outlander-second-screen-experience-ebook/dp/B00E392ZBQ/ref=sr_1_2?s=digital-text&ie=UTF8&qid=1456058499&sr=1-2&keywords=%22second+screen%22.

Omar, Michael; Dual-Display Ebook Reader (Jul. 2, 2008) Can be seen at: http://www.luxury-insider.com/luxury-news/2008/07/dual-display-ebook-reader.

\* cited by examiner

MULTI-DEVICE CONTENT PRESENTATION

FIELD OF THE INVENTION

The present invention generally relates to presenting content on multiple device in parallel.

BACKGROUND OF THE INVENTION

Content presentation applications such as web browsers, document readers and multimedia players are known in the art. Many such applications have been implemented for use with handheld computing devices (such as smartphones and computer tablets) to enable users to access and present content in a mobile environment.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

Figure 1:
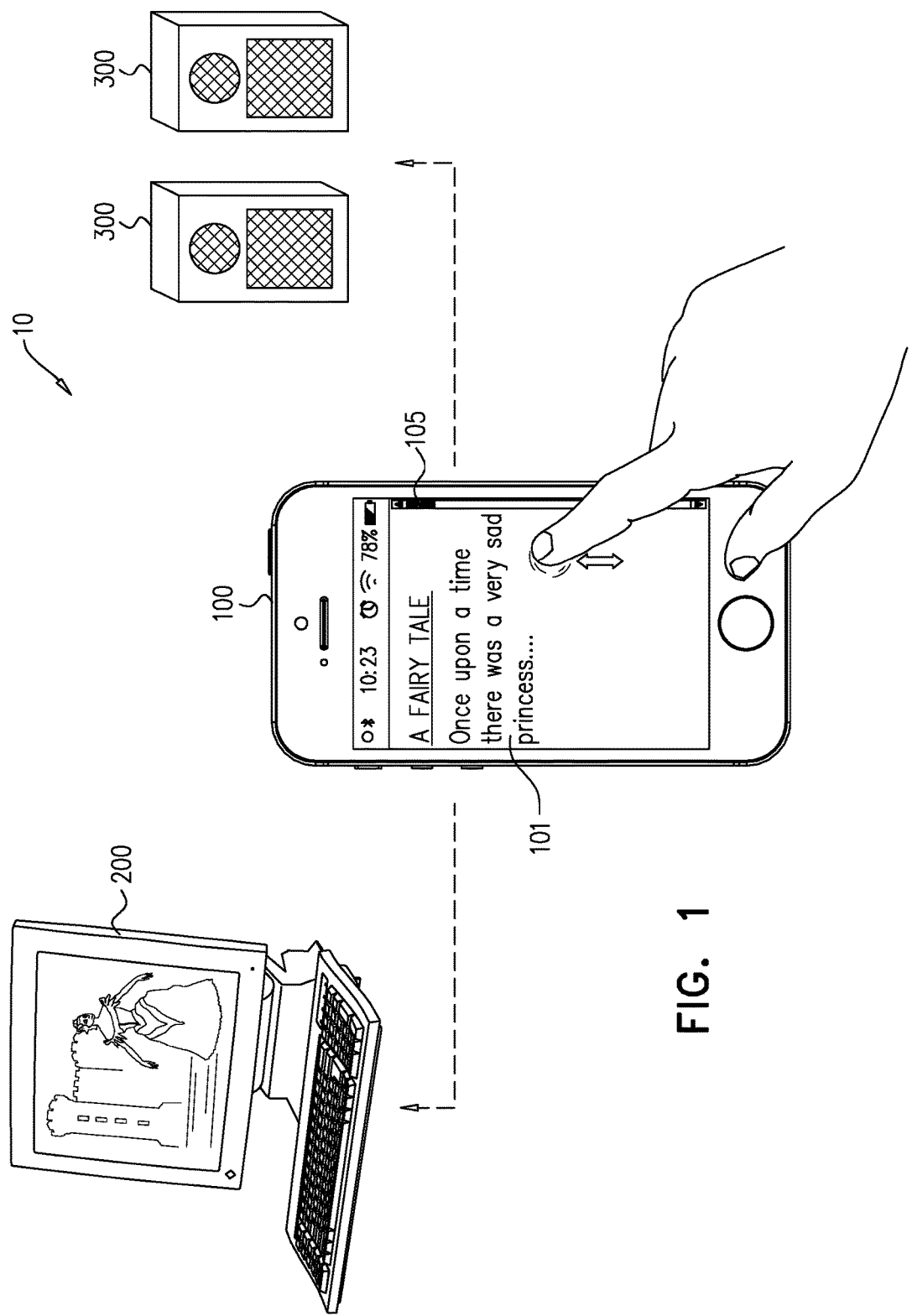
FIG. 1 is a simplified pictorial illustration of an exemplary multi-device content presentation system, constructed and operative in accordance with embodiments described herein.

A method for presenting multimedia content on multiple devices is implemented on a controlling computing device and includes: receiving selection of a multimedia content item, the multimedia content item including at least two media segments each of a different type, defining a first media segment of the at least two media segments as a primary media segment, defining at least a second media segment of the at least two media segments as at least one secondary media segment, allocating the at least one secondary media segment for presentation on at least one secondary presentation device, presenting the primary media segment on the computing device, detecting a current progress in the presenting, and based on said current progress, forwarding to the at least one secondary presentation device an indication of an instruction for synchronizing presentation of the at least one secondary media segment with said presenting.

A method for presenting a multimedia content item on multiple devices is implemented on a computing device and includes: controlling a synchronized presentation of a primary media segment and at least one secondary media segment from the multimedia content item on the computing device and at least one secondary presentation device, where the controlling includes: presenting the primary media segment on the computing device, where the primary media segment is textual content from the multimedia content item, detecting progress in the presenting, and forwarding presentation instructions for the at least one secondary media segment to the at least one secondary presentation device, where the secondary media segment is visual content from the multimedia content item.

DETAILED DESCRIPTION OF EXAMPLE EMBODIMENTS

It will be appreciated that the content presented by content presentation applications in webpages, electronic magazines, e-books, video clips, etc. may be multimedia content, comprising multiple types of media or data. When presenting multimedia content, different types of data may be interleaved on the display screen by the content presentation application. For example, a web page may comprise text, still images, and/or video. Similarly, the pages of an e-book may comprise text, still images, video, and/or an audio track.

It will be appreciated that the presentation of text, still images, and/or video, either jointly, or in parallel, may constrained by the size of the display screen available to the content presentation application. Content providers may employ several techniques to compensate for the size of the display screen. The content may be provided linearly, where it is displayed gradually in response to scrolling or paging commands. Some, or all, of the different media types may also be presented in reduced resolution to fit more of the content on a page; a given portion of the content may be enlarged in response to a user request. Some of the media may not be displayed until specifically requested. However, it will be appreciated that at any given time, the presentation of media content may still be constrained by the size of the display screen in use.

Reference is now made to FIG. 1 which is a simplified pictorial illustration of a display of an exemplary multi-device content presentation system 10, constructed and operative in accordance with embodiments described herein. System 10 comprises computing device 100 and display device 200 which may communicate with each other using any suitable means for communication, such as, for example, WiFi, Bluetooth, or a home network. As depicted in FIG. 1, computing device 100 may be a handheld device such as a smartphone or computer tablet. However, it will be appreciated that computing device 100 may be implemented as any suitable computing device capable of presenting media content to a user. As depicted in FIG. 1, display device 200 may be implemented using a computer's peripheral display screen. However, it will be appreciated that display device 200 may be implemented as any suitable display device capable of presenting visual media content to a user. For example, display device 200 may also be implemented as a television, a computer laptop, or a handheld device such as a smartphone or computer tablet.

In accordance with embodiments described herein, computing device 100 may be configured to allocate media segments from a multimedia content item to be presented on multiple devices. For example, the multimedia content item may comprise a text segment and an image segment. As shown in FIG. 1, computing device 100 may allocate the text segment to be displayed on computing device 100, and the image segment may be allocated for display on display device 200. It will be appreciated that display device 200 may similarly be allocated a video segment in addition to, or instead of, an image segment.

In accordance with embodiments described herein, computing device 100 may be defined within the context of system 10 as a controlling device, and display device 200 may be configured as a secondary presentation device. It will be appreciated that the embodiments described herein are not limited to a single secondary presentation device. As will be described in further detail hereinbelow, system 10 may support the use of multiple secondary presentation devices.

The controlling device, i.e., computing device 100, may be configured to control the concurrent flow of the presentation of the media segments on both the controlling device and the secondary device(s). Accordingly, when computing device 100 begins to present a media segment from the multimedia content item, it may send a "start now" command to the secondary device(s), i.e., display device 200, to begin presenting a different media segment. Alternatively, computing device 100 may delay the sending of the "start now" command until a certain point is reached in the presentation of the media segment on computing device 100.

For example, as depicted in FIG. 1, computing device 100 is presenting the allocated text segment as textual content 101, i.e., the text for "A FAIRY TALE". In response to the "start now" command, display device may begin to display images from the allotted image segment. As the presentation of textual content 101 progresses on computing device 100, computing device 100 sends a progress update to display device 200. For example, a user of computing device 100 may use scroll bar 105 to scroll through textual content 101. Alternatively, or in addition, the user may use page downs, page ups, menu selections, hyperlinks, and/or other user interface (UI) methods known in the art to navigate the presentation of textual content 101. Alternatively, or in addition, computing device 100 may be configured with an autonomous playout feature (e.g., the textual segment scrolls continuously, advances at set intervals, etc.) to continuously present textual content 101 without proactive user interaction.

In response to such progress updates, display device 200 presents images from the image segment associated with the current progress of the presentation of textual content 101 on computing device 100. In such manner, a controlling device may synchronize the presentation of the multiple media segments on the controlling device and secondary device(s). As long as computing device 100 continues to present textual content 101, display device 200 may display corresponding images.

It will be appreciated that the allocation of an image segment to display device 200 may be exemplary, the embodiments described herein may also support the presentation of other media segments, such as video (as opposed to still images), on display device 200.

Accordingly, as described herein, system 10 may facilitate the separation of text from visual contents for synchronized presentation on multiple devices. For example, the text (i.e., textual content 101 in FIG. 1) will be displayed on a handheld device such as a smartphone, computer tablet, e-reader, etc., and the visual contents will be displayed on one or more separately implemented (presumably, although not necessarily, larger) additional devices (i.e. display devices 200) such as, for example, a computer monitor, television, projection system, etc.

It will be appreciated that in addition to screen size, display device(s) 200 may also provide a higher quality of image/video presentation than may be available from computing device 100. For example, display device(s) 200 may be configured to provide a higher resolution display than computing device 100. Display device(s) 200 may also be configured to compensate for drawbacks inherent to some computing devices 100. For example, if computing device 100 is implemented as an e-reader limited to use with greyscale screens, system 10 may enable the user to experience an enhanced multimedia content presentation, even though hardware limitations (processor, screen color scheme) or software limitations (plugins, media playback) may otherwise preclude such a presentation on computing device 100.

System 10 may also comprise one or more speaker(s) 300. As depicted in FIG. 1, speakers 300 may be implemented as computer peripheral speakers or speakers such as typically included in a stereo sound system. It will however be appreciated that speaker(s) 300 may be implemented using any suitable device for audio playout, including, for example, a built-in speaker in a personal computer or laptop. It will similarly be appreciated that display device 200 may also comprise the functionality of speaker(s) 300 in a single integrated unit.

It will be appreciated that a multimedia content item may also comprise an audio segment. In accordance with embodiments described herein, computing device 100 may play out the audio segment in a corresponding manner to the presentation of textual system 110. Alternatively, or in addition, system 10 may be operative to allocate the audio segment playing out on speaker(s) 300 in similar manner as the display of image segments or video segments on display device 200.

Figure 2:
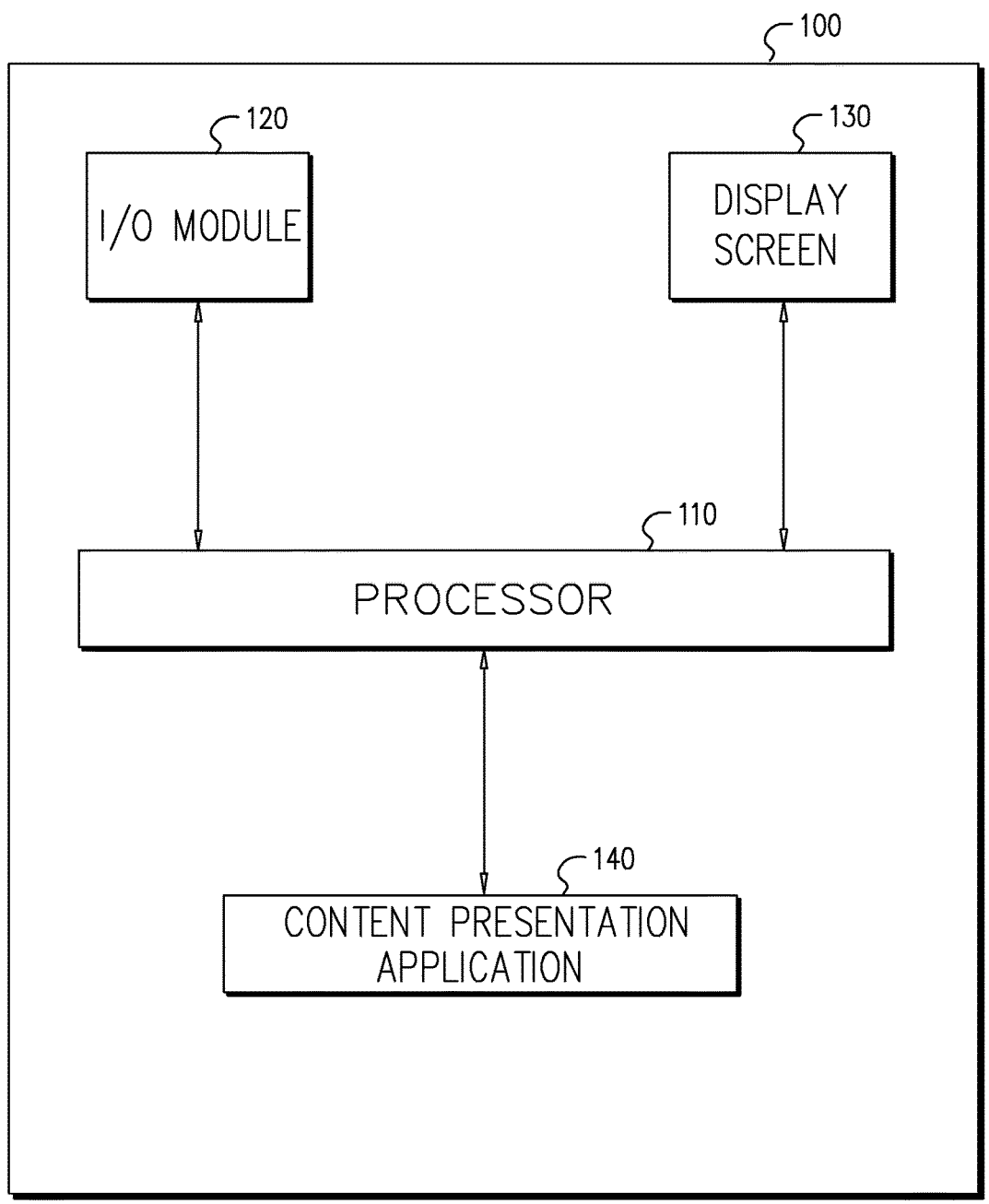
FIG. 2 is a block diagram of an exemplary computing device in the exemplary multi-device content presentation system of FIG. 1.

Reference is now made to FIG. 2 which is a block diagram of a computing device 100, constructed and operative in accordance with embodiments described herein. Computing device 100 may be implemented as any suitable computing device such as, but not limited to, a smartphone, personal computer, laptop computer, computer tablet, or e-reader that may be operative to provide the functionality described hereinabove with reference to FIG. 1.

It will be appreciated by one of skill in the art that computing device 100 comprises hardware and software components that may provide at least the functionality of the embodiments described herein. For example, computing device 100 may comprise at least processor 110, I/O module 120, display screen 130, and content presentation application 140. I/O module 120 may be implemented as a transceiver, USB port, or similar means suitable for transmitting and receiving data between computing device 100 and other devices such as display device 200 and speakers 300. Such data may be, for example, media segments from a multimedia content item, as well as control data indicating segment allocation and/or presentation instructions. It will be appreciated that computing device 100 may communicate with display device 200 and/or speakers 300 over a wireless or cabled connection using, for example, Bluetooth, WiFi, or a home network.

In accordance with some embodiments described herein, display screen 130 may be implemented as a touchscreen to detect the direct input of UI gestures, for example, a swiping gesture to scroll through textual content 101 (FIG. 1). However, it will be appreciated that the embodiments described herein may also support the use of menu selections and/or mouse clicks either in addition to a touchscreen, and/or to compensate for a lack of touchscreen functionality. It will be appreciated that display screen 130 may be implemented as a built-in integrated component of computing device 100, or alternatively as an attached peripheral device.

Content presentation application 140 may be any suitable application implemented in software and/or hardware that may be operative to facilitate a multi-device presentation of multimedia content in the context of system 10 (FIG. 1). For example, content presentation application 140 may be implemented as functionality added to Windows Media Player® or Amazon Kindle®. Alternatively, content presentation application 140 may be implemented as proprietary software or hardware. It will, however, be appreciated that content presentation application 140 may be implemented within the context of any suitable multimedia presentation application.

Figure 3:
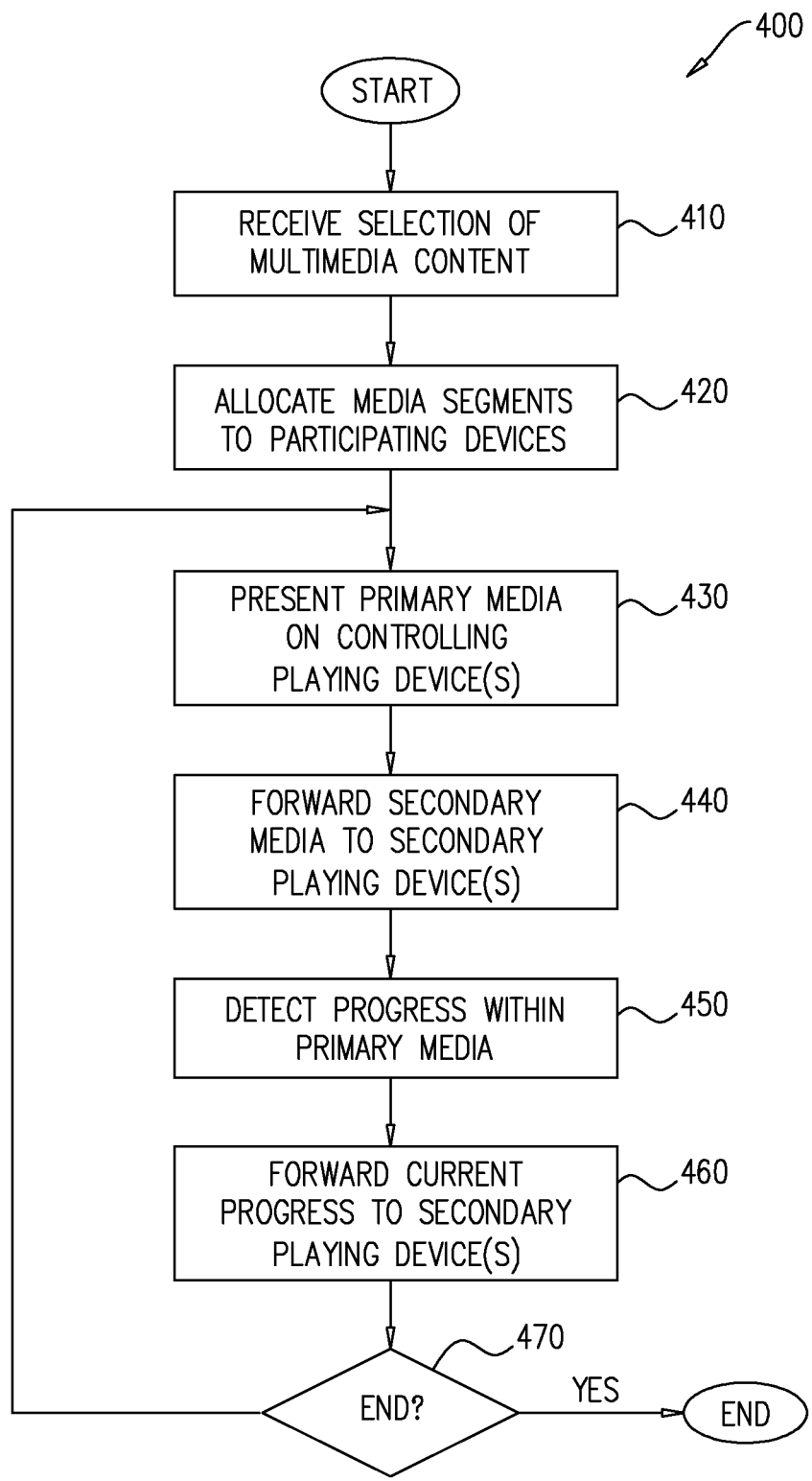
FIG. 3 is a flowchart of an exemplary multi-device content presentation process to be executed on the computing device of FIG. 2.

It will be appreciated that computing device 100 may comprise more than one processor 110. For example, one such processor 110 may be a special purpose processor operative to execute content presentation application 140. Reference is now also made to FIG. 3 which illustrates an exemplary notification process 400 to be performed by content presentation application 140 in accordance with embodiments described herein.

Content presentation application 140 (FIG. 2) receives (step 410) selection of a multimedia content item, For example, content presentation application 140 may be implemented as an e-booker reader and the user of computing device 100 selects a story to read, e.g., "A FAIRY TALE" as depicted in FIG. 1. It will be appreciated that the selection may be associated with a locally stored multimedia content item, e.g., a multimedia content item stored in a memory (not shown) on computing device 100. Alternatively, or in addition, the multimedia content item may be stored in an insertable storage unit such as, for example, a disk-on-key, a CD-ROM, or a DVD. Alternatively, or in addition, it may be stored remotely and accessed via a communications network such as, for example, the Internet or a local area network (LAN).

Content presentation application 140 allocates (step 420) media segments devices to devices participating in system 10. For example, as per the exemplary embodiment of FIG. 1, content presentation application 140 may allocate textual segment 110 to be presented on computing device 100; an image segment to be displayed on display device 200; and an audio segment to be displayed on speakers 300.

It will be appreciated that the participating devices referred to with respect to step 420 may be pre-configured to provide services to computing device 100 within the context of system. It will be appreciated that some participating devices may be implemented with sufficient resources to facilitate participation in system 10 without pre-configuration. For example, display device 200 may be implemented on a computing device configured similarly to computing device 100. Accordingly, content presentation application 140 may also be operative to employ I/O module 130 to search for potential participating device prior to, or in parallel with the allocation of step 420, e.g., computing device 100 may initiate a Bluetooth pairing request to connect with display device 200 prior to step 420.

Content presentation application 140 may present (step 430) a primary media segment on the controlling device, i.e., on display screen 130 (FIG. 2). The primary media segment is the media segment according to whose progress, the secondary media segments are synchronized. For example, as depicted in FIG. 1, the primary media segment may be textual content 101. It will be appreciated that more that both the primary media segment and a secondary media segment may be presented on the same device. For example, per the embodiment of FIG. 1, textual content 101 may be the primary media segment. However, computing device 100 may also present a secondary media segment in synchronization with textual content 101. For example, computing device 100 may also present an audio segment based on progress detected with the primary media segment.

It will further be appreciated the depiction of textual content 101 as the primary media may be exemplary; the embodiments described herein may also support the employment of non-textual content as the primary media segment to be presented on the controlling device. For example, the exemplary embodiment of FIG. 1 may represent a configuration suitable for a parent to read a multimedia e-book to a child. As the parent progresses through textual content 101, the child may view the images on display device 200. However, in a different configuration of the multimedia e-book, the child may view the images on the controlling device, i.e., computing device 100. As the child progresses through the images on the controlling device, an audio segment may be played on speakers 300.

Content presentation application 140 may forward (step 440) secondary media segments to one or more secondary devices as per the allocation performed in step 420. For example, as per the embodiment of FIG. 1, content presentation application 140 may employ I/O module 120 (FIG. 2) to forward an image/video segment to display device 200, and/or an audio segment to speakers 300. Alternatively, one or more of the secondary devices may be configured to independently access its allocated media without relying on computing device 100 to forward the media segment. For example, display device 200 may download its allocated media segment directly from the Internet.

Content presentation application 140 may detect (step 450) progress within the primary media presented on the controlling device. For example, as per the embodiment of FIG. 1, Content presentation application 140 may detect scrolling, menu selection, or hyperlink clicking in textual content 101. It will be appreciated that such progress may also include a proactive request to present a secondary media segment. For example, textual content 101 may comprise a hyperlink associated with a video or still image. For the purposes of detecting progress within textual content 101, content presentation application 140 may interpret a click on the hyperlink as such progress, even if the text presented on computing device 100 does not change in response to the click. In such manner, the user of computing device 100 may effectively proactively request the display of an image and/or the playing of a video clip or audio clip on a secondary device.

Content presentation application 140 may forward (step 460) an indication of the current progress as detected in step 450 to the secondary devices, i.e., display device 200 and/or speakers 300 in order to facilitate the synchronized presentation of their associated media segments in accordance with the current progress. Depending on the configuration of the secondary devices, the indication may provide an indication of the current progress that may then be interpreted by the secondary device(s) to determine the portion of an allocated media segment to play. Alternatively, the indication may comprise instructions for playing out the allocated media segment in synchronization with the primary media segment on the controlling device.

Process 400 may continue to loop through steps 430-460 until and end condition is met (step 470), e.g., the user of computing device 100 requests to proactively end the presentation of the multimedia content item, or the multimedia content item ends.

It will be appreciated that the specific order of the steps of process 400 may be exemplary. For example, in accordance with embodiments described herein, step 440 may be performed before step 430; step 450 may performed before step 430 and/or step 440; etc.

It will also be appreciated that the representation of content presentation application 140 as an e-book reader is exemplary; the embodiments described herein may support other application types for content presentation application 140. For example, content presentation application 140 may also be implemented as a web browser configured to provide multi-device presentation for web-pages comprising more than one type of media content. Similarly, content presentation application 140 may be implemented as a digital magazine presenting application. In such implementations, content presentation application 140 may be operative on a controlling device to allocate different media segments for presentation on different devices in synchronization with the presentation of a primary media segment on the controlling device.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for presenting multimedia content on multiple devices, the method implemented on a controlling computing device and comprising:
    receiving a selection of a multimedia content item, said multimedia content item comprising at least two media segments each of a different type;
    defining a first media segment of said at least two media segments as a primary media segment;
    defining at least a second media segment of said at least two media segments as at least one secondary media segment;
    allocating said at least one secondary media segment for presentation on at least one secondary presentation device;
    presenting said primary media segment on said computing device;
    detecting a current progress in said presenting;
    based on said current progress, forwarding to said at least one secondary presentation device an indication of an instruction for synchronizing presentation of said at least one secondary media segment with said presenting.

2. The method according to claim 1 and further comprising:
    forwarding said at least one secondary media segment to said at least one secondary presentation device.

3. The method according to claim 1 and wherein said detecting a current progress comprises:
    detecting scrolling in said primary media segment.

4. The method according to claim 1 and wherein said detecting a current progress comprises:
    detecting a navigation menu selection for said primary media segment.

5. The method according to claim 1 and wherein said detecting a current progress comprises:
    detecting a click on a hyperlink in said primary media segment.

6. The method according to claim 1 and wherein said detecting a current progress comprises:
    autonomously playing out said primary media segment without proactive user intervention.

7. The method according to claim 1 and wherein said primary media segment is textual content.

8. The method according to claim 1 and wherein said primary media segment is visual content.

9. The method according to claim 1 and wherein said primary media segment is audio content.

10. The method according to claim 1 and wherein said forwarding comprises:
    communicating with said at least one secondary presentation device via a wireless connection.

11. The method according to claim 1 and wherein said forwarding comprises:
    communicating with said at least one secondary presentation device via a cable connection.

12. The method according to claim 1 and wherein said controlling computing device is a handheld device.

13. The method according to claim 1 and wherein said at least one secondary presentation device is a television.

14. The method according to claim 1 and wherein said at least one secondary presentation device is a computer monitor.

15. The method according to claim 1 and wherein said at least one secondary presentation device is an audio speaker.

16. The method according to claim 1 and wherein said allocating comprises:
    allocating at least two said secondary media segment to said one secondary presentation device.

17. The method according to claim 1 and further comprising:
    presenting at least one of said at least one secondary media segment on said controlling computing device.

18. The method according to claim 1 and further comprising:
    forwarding said at least one secondary media segment to said at least one secondary presentation device.

19. A controlling multimedia playout computing device comprising:
    means for receiving selection of a multimedia content item, said multimedia content item comprising at least two media segments each of a different type;
    means for defining a first media segment of said at least two media segments as a primary media segment;
    means for defining at least a second media segment of said at least two media segments as at least one secondary media segment;
    means for allocating said at least one secondary media segment for presentation on at least one secondary presentation device;
    means for presenting said primary media segment on said computing device;
    means for detecting a current progress in said presenting;
    means for forwarding to said at least one secondary media segment an indication of an instruction for synchronizing presentation of said at least one secondary media segment synchronizing presentation of said at least one secondary media segment with said presenting based on said current progress.

20. A method for presenting a multimedia content item on multiple devices, the method implemented on a computing device and comprising:

controlling a synchronized presentation of a primary media segment and at least one secondary media segment from said multimedia content item on said computing device and at least one secondary presentation device, wherein said controlling comprises:

presenting said primary media segment on said computing device, wherein said primary media segment is textual content from said multimedia content item, detecting progress in said presenting, and forwarding presentation instructions for said at least one secondary media segment to said at least one secondary presentation device, wherein said secondary media segment is visual content from said multimedia content item.

\* \* \* \* \*